US006962277B2

(12) United States Patent
Quintana et al.

(10) Patent No.: US 6,962,277 B2
(45) Date of Patent: Nov. 8, 2005

(54) APPARATUS AND METHOD FOR USING A WEARABLE COMPUTER IN TESTING AND DIAGNOSTIC APPLICATIONS

(75) Inventors: W. Vincent Quintana, Bath, ME (US); Benjamin J. Albis, West Bath, ME (US); J. Scott Houston, Topsham, ME (US); F. Christopher Mitchell, Arlington, VA (US)

(73) Assignee: Bath Iron Works Corporation, Bath, ME (US)

( * ) Notice: Subject to any disclaimer, the term of this patent is extended or adjusted under 35 U.S.C. 154(b) by 0 days.

(21) Appl. No.: 09/739,136

(22) Filed: Dec. 18, 2000

(65) Prior Publication Data

US 2002/0074370 A1 Jun. 20, 2002

(51) Int. Cl.[7] .................................................. A45F 3/08
(52) U.S. Cl. ....................... 224/262; 224/637; 224/639; 224/647; 224/649; 224/682; 224/684; 224/908; 224/930; 361/683; 709/201; 709/204; 709/217; 709/218; 709/250; 710/73
(58) Field of Search ................................. 224/262, 263, 224/264, 265, 637, 639, 646, 647, 648, 649, 682, 684, 908, 930; 361/683, 730; 709/200, 201, 204, 217, 218, 250; 710/73

(56) References Cited

U.S. PATENT DOCUMENTS

| 4,976,387 A | * 12/1990 | Spianti ........................ 224/262 |
| 5,124,915 A | 6/1992 | Krenzel |
| 5,305,244 A | 4/1994 | Newman et al. |
| 5,533,097 A | 7/1996 | Crane et al. |
| 5,675,807 A | 10/1997 | Iswandhi et al. |
| D385,855 S | 11/1997 | Ronzani |
| 5,691,713 A | 11/1997 | Ishida |
| D387,898 S | 12/1997 | Ronzani |
| 5,699,244 A | 12/1997 | Clark, Jr. et al. |
| D390,552 S | 2/1998 | Ronzani |
| 5,719,743 A | 2/1998 | Jenkins et al. |
| 5,719,744 A | 2/1998 | Jenkins et al. |
| 5,726,660 A | 3/1998 | Purdy et al. |
| 5,757,339 A | 5/1998 | Williams et al. |
| 5,774,338 A | * 6/1998 | Wessling, III .............. 224/930 |
| 5,787,298 A | 7/1998 | Broedner et al. |
| 5,831,198 A | * 11/1998 | Turley et al. ................ 224/262 |
| 5,844,656 A | 12/1998 | Ronzani et al. |
| 5,844,824 A | 12/1998 | Newman et al. |
| 5,893,037 A | 4/1999 | Reele et al. |
| D411,179 S | 6/1999 | Toyosato |
| 5,948,047 A | 9/1999 | Jenkins et al. |
| 5,983,073 A | 11/1999 | Ditzik |

(Continued)

OTHER PUBLICATIONS

"Case Study—Shipbuilder Trims Inspection and Troub Troubleshooting Time by 70%," ViA, Inc. web site (www.via-pc.com), 5/00 (precise date of publication unknown), published by ViA, Inc., Burnsville, Minnesota.
Steve Ditlea, "The PC goes ready-to-wear,": IEEE Spectrum, vol. 37, No. 10, Oct. 2000, (pages unknown—available online at www.spectrum.ieee.org).
Lisa Guernsey, Wearable Computers for the Working Class, N.Y. Times, Dec. 14, 2000.
Anne Eisenberg, The World Through PC Powered Glasses, N.Y. Times, Dec. 14, 2000.

Primary Examiner—Stephen K. Cronin
(74) Attorney, Agent, or Firm—Howrey LLP; Michael J. Bell (57) ABSTRACT

An apparatus and method for using a wearable computer in testing applications that uses a probe, a display, an audio communication device, a computer adapted to receive data from the probe, exchange data with the display, exchange data with the audio communications device, and exchange data using wireless communication, a battery, and a harness for securing the probe, display, computer, and battery to a person's body.

15 Claims, 4 Drawing Sheets

U.S. PATENT DOCUMENTS

| | | |
|---|---|---|
| 5,991,831 A | 11/1999 | Lee et al. |
| 5,995,936 A | 11/1999 | Brais et al. |
| 5,999,952 A | 12/1999 | Jenkins et al. |
| 6,006,286 A | 12/1999 | Baker et al. |
| 6,023,241 A | 2/2000 | Clapper |
| 6,029,183 A | 2/2000 | Jenkins et al. |
| 6,049,813 A | 4/2000 | Danielson et al. |
| 6,055,372 A | 4/2000 | Kardach et al. |
| D423,761 S | 5/2000 | Ng et al. |
| 6,057,966 A | 5/2000 | Carroll et al. |
| 6,061,411 A | 5/2000 | Wooten |
| 6,064,566 A | 5/2000 | Agata et al. |
| 6,219,697 B1 | 4/2001 | Lawande et al. |
| 6,219,736 B1 | 4/2001 | Klingman |
| 6,249,427 B1 | 6/2001 | Carroll |
| 6,260,202 B1 * | 7/2001 | Villalobos et al. .......... 224/930 |
| 6,285,757 B1 | 9/2001 | Carroll et al. |
| 6,292,213 B1 * | 9/2001 | Jones ........................ 224/930 |
| 6,305,587 B1 * | 10/2001 | Miller ....................... 224/930 |
| 6,356,968 B1 | 3/2002 | Kishon |

* cited by examiner

APPARATUS AND METHOD FOR USING A WEARABLE COMPUTER IN TESTING AND DIAGNOSTIC APPLICATIONS

CROSS REFERENCE TO RELATED APPLICATIONS

This application is directed to subject matter that is related to the subject matter of U.S. patent application Ser. No. 09/696,758 for "Apparatus and Method for Using a Wearable Personal Computer" filed Oct. 25, 2000 and U.S. patent application Ser. No. 09/721,091 for "Apparatus and Method for Using a Wearable Computer In Collaborative Applications" filed Nov. 22, 2000.

BACKGROUND OF THE INVENTION

1. Field of the Invention

The present invention relates generally to wearable computers, and more particularly to a wearable computer for use in testing and diagnostic applications.

2. Description of the Related Art

The need to conduct tests and other diagnostic procedures upon electrical, electronic, mechanical, and electromechanical devices is omnipresent in today's world. From the corner auto garage to U.S. Naval ships, there is a constant need to perform testing and other diagnostic procedures both to ensure that components are operating properly and to determine the precise cause of a problem when a malfunction occurs. There are numerous individual testing and diagnostic components that must be used when conducting these tests and diagnostic procedures. There are countless technical manuals and other sources of information that must be referenced by the individual conducting these tests and other diagnostic procedures. In addition, the individual conducting the tests and other diagnostic procedures must be trained to properly operate the testing and diagnostic devices.

As an example, the United States Navy presently uses over 300 pieces of General Purpose Electronic Test Equipment on its AEGIS class destroyers. Some of this equipment is quite large and cumbersome, yet must be transported to the device that requires servicing. In addition, the individual who uses the test and diagnostic equipment must be properly trained regarding the operation of the test equipment and must transport technical information regarding the equipment to be tested. In addition to this example, there are numerous other situations where a wide variety of test equipment must be kept on hand and transported to the device requiring servicing.

Wearable computers are computers that may be physically worn on the body of the person operating the computer. Wearable computers are preferred when there is insufficient space to set up a lap top or desk top computer. Wearable computers have been used for report preparation and other data gathering activities. However, the use of a wearable computer only for data gathering functions does not meet the needs of conducting testing and other diagnostic applications. In addition, even if a wearable computer that had the requisite technical information regarding the testing and diagnostic applications were available on site, it would be of limited use absent the ability to collaborate with one or more other individuals who could offer expertise and insight into the testing or diagnostic application being conducted.

Therefore, it would be desirable to provide an on-site technician with the ability to use a wearable computer that combines numerous pieces of testing and diagnostic equipment into a single component, makes available all technical information that may be required by the technician while on-site, and facilitates real time collaboration between the technician and one or more individuals at any location who can assist the technician and provide additional information and advice.

SUMMARY OF THE INVENTION

The present invention is a method and apparatus for using a wearable computer in on-site testing and diagnostic analysis applications. For example, the present invention may be used in manufacturing, maintenance, and repair applications as well as any other industrial, manufacturing, or construction applications where electrical, electronic, mechanical, and/or electromechanical components are tested or otherwise analyzed. The present invention permits an on-site technician or other individual ("technician") to collect data regarding the quantifiable properties of an object of interest; collaborate in real time with a remote subject matter expert or other individual who can assist the technician ("remote expert"); collect video, detailed imagery, and/or infrared imagery data regarding the object of interest and transmit this data in real time; access technical manuals and/or other information while on-site; and transmit data using wireless communication. The quantifiable property data ("Property Data") that can be collected from the object of interest includes, without limitation, voltage, resistance, current, temperature, frequency, revolutions per minute ("RPM"), vibration, viscosity, pressure, and any other quantifiable property of an electrical, electronic, mechanical, and/or electro-mechanical device. In addition, the technician may use the present invention in a "store and forward" manner in which Property Data is collected and stored locally by the technician and later uploaded or transferred, as required, to another computer for storage and/or further analysis.

The present invention overcomes the limitations of conventional testing and diagnostic equipment and procedures by combining the numerous individual conventional testing and diagnostic devices that are generally used into a single compact unit that is portable. In addition, the present invention permits real time collaboration between the on-site technician and the remote expert. Through the use of real time streaming video and real time streaming infrared video, the remote expert is able to provide real time "over the shoulder" advice to the technician while the technician is still on-site. The present invention also permits the technician and remote expert to annotate images and other data in real time to further improve the efficiency and effectiveness of the technician's performance while on-site. The present invention likewise permits the technician to access technical information while on-site. This technical information includes, without limitation, blueprints, interactive troubleshooting and maintenance procedures, electrical schematic diagrams, fault logic diagrams, fault isolation processes, and troubleshooting routines.

The substantial versatility of the present invention and its ability to facilitate real time collaboration enable the present invention to be used in a large variety of different applications and environments. In addition, the present invention may be used in training applications where one or more technicians may conduct training exercises with one or more remote experts. In addition, the present invention may be used to create training materials based upon the data collected and stored by either the technician, remote expert, or both.

The present invention preferably comprises a probe, a general inspection camera, a detailed inspection camera, a headset, a computer, and a harness that is used to support the foregoing components from the body of the person wearing the present invention. In another embodiment, the present invention may further comprise an infrared camera that can be used in lieu of or in conjunction with the detailed inspection camera.

DETAILED DESCRIPTION OF THE PREFERRED EMBODIMENT

Figure 1:
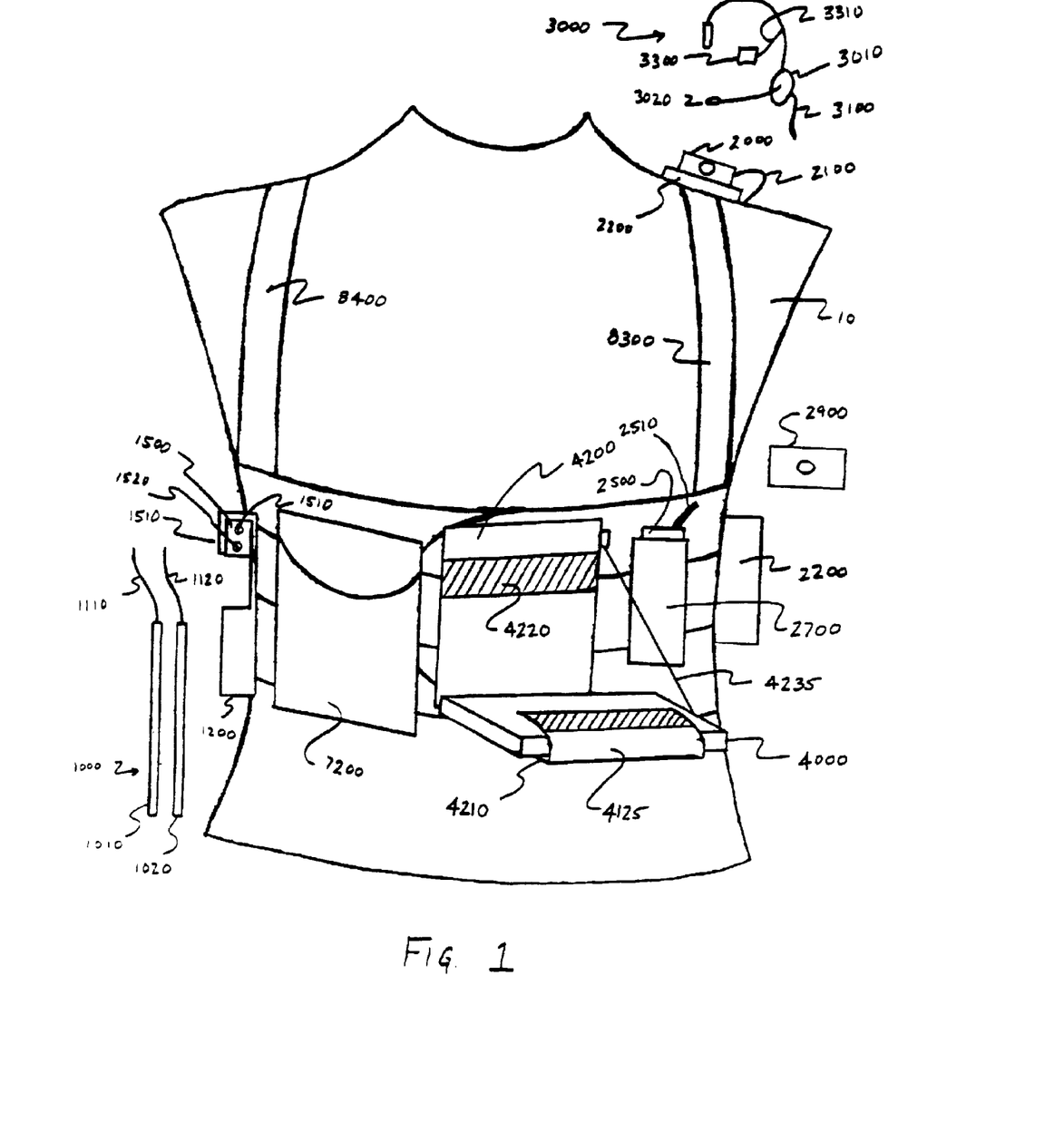
FIG. 1 is a front view of the present invention as worn on the body of a person.
Figure 2:
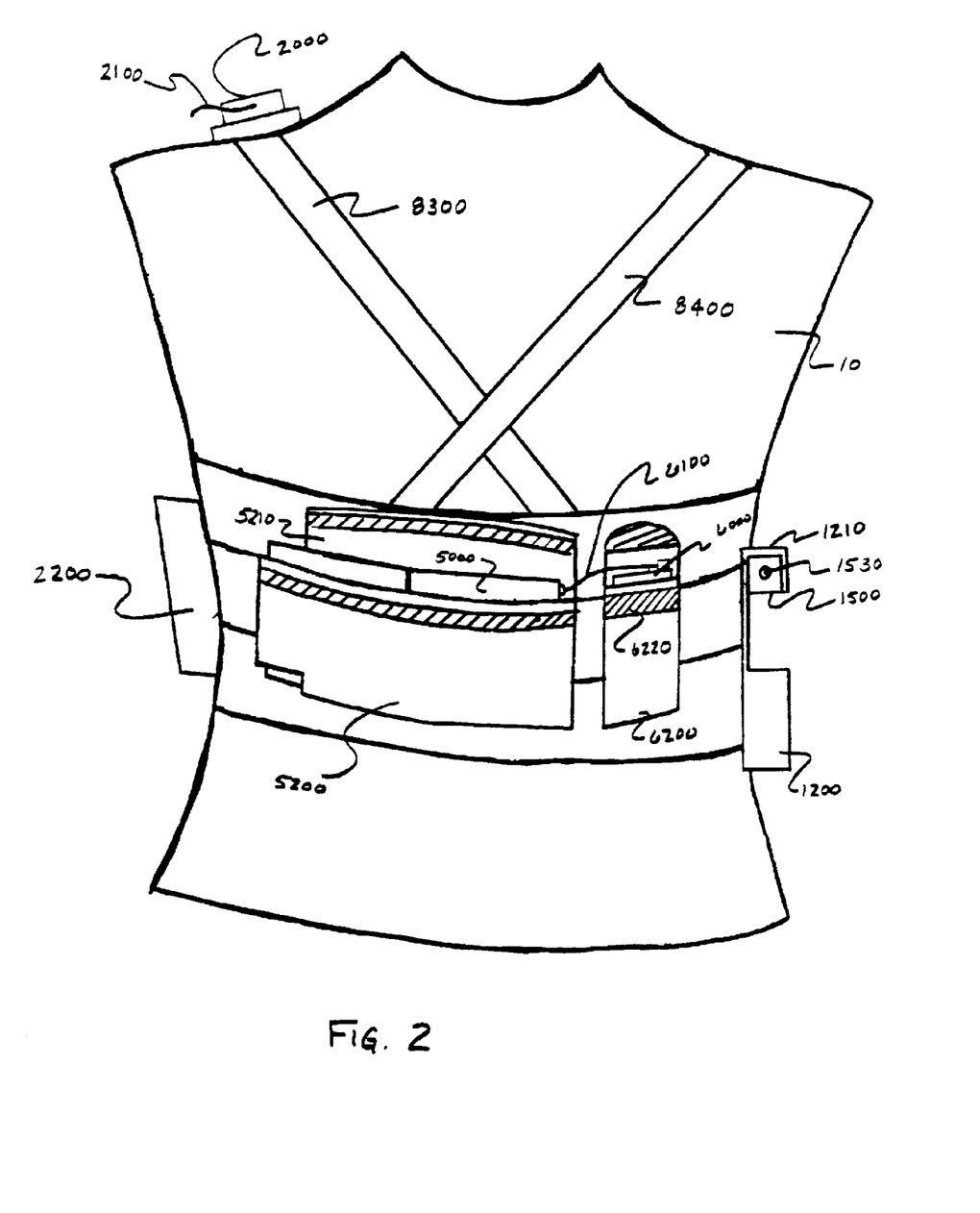
FIG. 2 is a rear view of the present invention as worn on the body of a person.
Figure 4:
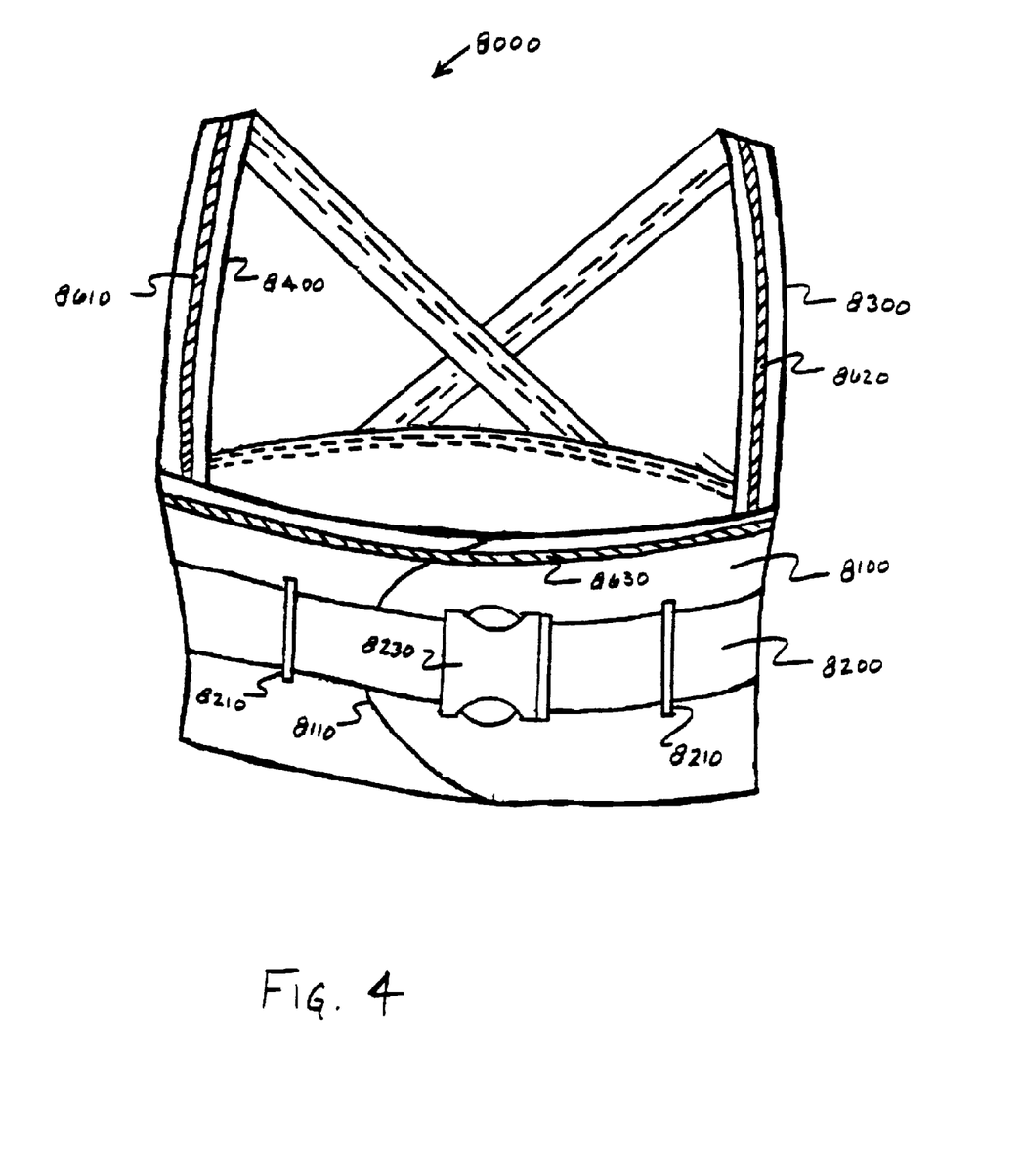
FIG. 4 is a schematic diagram of an apparatus to support components from the body of a person according to the present invention.

Referring to FIGS. 1, 2, and 4, the present invention preferably comprises a probe 1000 that may be stored in a probe case 1200, a general inspection camera 2000 that may be stored in a general inspection camera case 2200, a detailed inspection camera 2500 that may be stored in detailed inspection camera case 2700, a headset 3000 with a head-mounted display ("HMD") 3300, a display unit 4000 preferably stored in a display housing 4200, a computer 5000 preferably stored in a computer housing 5200, a battery 6000 preferably stored in a battery housing 6200, an accessory pouch 7200, and a harness 8000 that may support any or all of the foregoing and/or other components from the body 10 of the person using the present invention. In another embodiment of the present invention, an infrared camera 2900 may be used in lieu of or in conjunction with detailed inspection camera 2500. If used, infrared camera 2900 can be stored in case 2200.

1. Computer

Referring to FIG. 2, computer 5000 preferably is used in the present invention to provide a platform in which numerous data collection and analysis applications can be combined into one component. Computer 5000 preferably also is used to facilitate real time collaboration between the technician and remote expert using wireless communication to exchange audio, video, and/or other data in real time. The real time collaboration capabilities through the use of computer 5000 can permit the remote expert to provide "over the shoulder" advice to the technician as Property Data or other information is gathered. Computer 5000 preferably is a wearable computer. As shown in FIG. 2, computer 5000 preferably is stored in computer housing 5200 to support computer 5000 from harness 8000.

Computer 5000 preferably utilizes software that permits numerous data collection and analysis applications to be run using a common component, namely computer 5000. The software used preferably permits the data collection and other analysis capabilities of numerous conventional "stand alone" testing and analysis devices to be incorporated into computer 5000. The software used according to the present invention preferably is characterized by the functionality of "stand alone" components that include, but are not limited to, a digital multi meter, oscilloscope, dynamic signal analyzer, arbitrary waveform generator, function generator, counter/timer, logic analyzer, waveform editor, device calibrator, data logger, and any other device that may be used to collect quantifiable data from an electrical, electronic, mechanical, and/or electro-mechanical device. The use of such software preferably provides flexibility regarding the testing and analysis capabilities that are required or desired for a specific testing and/or analysis project.

The software used according to the present invention preferably is also characterized by functionality including, without limitation, a "soft front panel" that permits interactive measurements to be made using "virtual knobs and buttons" present on display 4000 that permit the present invention to be operated in a manner similar to conventional testing and analysis components; the capability to log and/or store data; and the capability to customize and/or save specific instrument configurations. This software preferably also is characterized by functionality that provides report-generation capabilities that can include, without limitation, time-stamps, measurements, user names, and comments, all of which may be included to supplement the raw data that is collected.

In a preferred embodiment, the software used with the present invention is Virtual Bench, available from National Instruments Corp., 11500 N. Mopac Expy., Austin, Tex., 78759-3504. In addition, any software that is suitable for meeting any or all of the above described characteristics may be used.

In another embodiment which can expand the capability of the testing and diagnostic capabilities of computer 5000 according to the present invention, wireless and wired network access protocols that include, without limitation, general purpose interface base ("GPIB"), ethernet, 802.11 (x) and Bluetooth are used to access installed test equipment or network stand-alone instruments that possess increased functionality over conventional equipment and instruments. In this embodiment, the components to be tested can transmit Property Data to computer 5000 using the previously described wireless and wired network access protocols rather than requiring a direct physical connection to computer 5000 using probe 1000. This embodiment preferably is used when an increased level of sophistication is required to conduct analyses of complex and/or high frequency waveforms. In this embodiment, control of access to and dissemination of the data collected by the present invention would be controlled by a data administration workstation (not shown).

While numerous wearable computers may be used as computer 5000, computer 5000 preferably is a ViA IIB or ViA IIC (Transmeta processor) wearable computer, available from ViA, Inc., 12550 West Frontage Road, Ste. 201, Burnsville, Minn. 55337, or a ViA IIR wearable computer, available from General Dynamics Information Systems, 8800 Queen Avenue South, Bloomington, Minn., 55431. The ViA IIR is a modified version of the ViA IIB.

The ViA IIB is preferable as computer 5000 because it uses a Cyrix processor, which generally consumes less power and generally has a cooler operating temperature than processors available from Intel and AMD. The ViA IIB preferably is used for computer 5000 because it possesses the following capabilities. The ViA IIB is Microsoft Windows 9X compatible and currently uses Windows 98 as its operating system. The ViA IIB has two internal PCMCIA slots that may accommodate a 100 mW wireless LAN card and other components. Using, for example, an Aironet wireless communication system, available from Cisco Systems, Inc., 170 West Tasman Drive, San Jose, Calif., 95134, computer 5000 is able to transmit and receive data over a WLAN connection using the IEEE 802.11(x) protocol.

In another preferred embodiment of the present invention, computer 5000 may be the ViA IIC, which incorporates a Transmeta Crusoe processor. Like the ViA IIB, the ViA IIC has two PCMCIA slots to accommodate wireless communication and other components. The ViA IIC is desirable because it uses a faster processor, provides increased RAM, provides increased hard-drive space, provides an increased Level II cache, produces less heat, and is capable of using a variety of operating systems including Windows 95, Windows 98, Windows 2000, Windows NT 4.0, and Sun, Hewlett-Packard, Apple Macintosh, and IBM operating systems.

In yet another embodiment of the invention, a ViA IIR may be used as computer 5000. The ViA IIR is desirable because it is "ruggedized" to withstand a greater shock than a conventional wearable computer can be expected to withstand. The ViA IIR takes the basic core unit of a commercial ViA IIB and consolidates it into a 3.8"×5.9"×1.6" box machined from a solid block of aluminum that is sealed to be water tight and able to withstand shock. A hollow cell is machined into the box containing the motherboard, processor, chipset, RAM and all other associated electronic components. This cell is waterproof and the motherboard is designed to use the thermal mass of its container as a heat sink.

To further enhance high heat performance, a cooling tunnel, located adjacent to the processor cell, is incorporated into the design of the ViA IIR. The tunnel contains a large aluminum heat sink and a compact cooling fan generating a steady air stream over its fins. In order to facilitate air exchange, the cooling tunnel is not sealed. The cooling fan is rugged enough to withstand repeated exposures to water and can be easily replaced if it is damaged. Preferably, a cooling fan providing greater airflow than the fan used in a standard ViA IIB is used to provide increased cooling capacity, thus allowing the ViA IIR to operate in a high temperature environment. A Cyrix or Transmeta processor preferably is used in the ViA IIR because of their relatively low power draw, thus allowing longer battery life and cooler running temperatures. This makes the ViA IIR preferable over other conventional wearable personal computers that use Intel and AMD processors that generally consume more power than the Cyrix processor.

The ViA IIR preferably may be used for computer 5000 because it possesses the following capabilities. The ViA IIR is Microsoft Windows 9X compatible, and cuffently uses Windows 98 as its operating system. In addition, the ViA IIR is also capable of using Windows NT 4.0 as its operating system. The ViA IIR has an internal PCMCIA slot that may accommodate a 100 mW wireless LAN card and other components. Using, for example, an Aironet wireless communication system, available from Cisco Systems, Inc., 170 West Tasman Drive, San Jose, Calif., 95134, computer 300 is able to transmit and receive data over a WLAN connection using the IEEE 802.11 protocol. The ViA IIR is modified for use according to the present invention to accommodate two PCMCIA cards.

Computer 5000 preferably includes an adaptor (not shown) to facilitate the exchange of data between probe 1000 and computer 5000. The adaptor (not shown) used may be a common computer adaptor that is characterized by PCMCIA, PCI, and PXI cardbus technology. The adaptor (not shown) may also by characterized by any other technology that will facilitate the exchange of data between probe 1000 and computer 5000. The use of PCMCIA technology generally will facilitate most data collection and analysis applications including, without limitation, the testing and analysis applications performed on board a ship. However, when dealing with high voltages and frequencies, the use of PCMCIA technology may be limited because of size restrictions and the ability of PCMCIA technology to dissipate heat. In applications involving high voltages and frequencies, PCI technology preferably is used. In this embodiment, a CardBus extender can be placed in the PCMCIA slot of computer 5000 and then connected to an external PCI card carrier (not shown) that can be powered by a DC battery power supply. The CardBus-PCI extender used in this embodiment can be supplied by Magma, Inc., 9918 Via Pasar, San Diego, Calif., 92126. In addition, any CardBus-PCI extender suitable for use with the present invention may be used.

In another embodiment of the present invention, as would be known to those skilled in the art, probe 1000 may be connected to computer 5000 using a USB, PCI, PXI, serial, or PCMCIA interface and any modifications necessary to allow computer 5000 to use a desired access protocol. In this embodiment, the USB interface and probe 1000 can be supplied by Intelligent Instrumentation, 3000 East Valencia Road, Suite 100, Tucson, Ariz. 85706. In addition, any other desired access protocol suitable for use with the present invention can be used.

The present invention may use wireless communication to permit collaborative data gathering and/or problem resolution between the technician wearing the present invention and the remote expert. The present invention permits the remote expert to provide real time "over the shoulder" advice as the technician engages in applications including, without limitation, problem identification, source or location identification, formulation of a corrective solution, and returning the object of interest to its original operating condition. The transmission of real time video data to the remote expert can facilitate "wordless communication," which permits the remote expert to interpret the situation encountered by the technician without any explanation from the technician. The present invention can also be used by the technician and/or remote expert to examine and analyze the Property Data that has been collected from the object of interest while still on-site. In addition, while remaining on-site, the technician can access technical information including, without limitation, blueprints, electrical schematic diagrams, fault logic diagrams, fault isolation processes, and troubleshooting routines.

The following is an example of how the technician and remote expert may collaborate in real time. After arriving at the location of interest and/or locating the object of interest, the technician may use wireless communication to transmit real time video using general inspection camera 2000 and exchange audio data using headset 3000 with the remote expert. In addition, the technician can transmit real time infrared video using infrared camera 2900. The real time video is transmitted using wireless communication from computer 5000 to the computer system being used by the remote expert. Computer 5000 may use software such as Netsnap, available from PeleSoft, Inc., 2115 Palm Bay Rd., N.E., Palm Bay, Fla. 32905, for the streaming of video using wireless communication. The use of real time video can permit the remote expert to assist the technician in selecting a suitable data source point on the object of interest, or assist in selecting an alternate data source point on the object of interest if the initial Property Data that is collected is irregular.

If desired, the technician may then collect high-resolution imagery snapshots of the object of interest using detailed inspection camera 2500 and download the snapshots to computer 5000. In addition, the technician can collect infrared images using infrared camera 2900 and download the infrared snapshots to computer 5000. The technician may then review the downloaded snapshots on display unit 4000 and make annotations to the snapshots using the "whiteboarding" feature of Microsoft Netmeeting. The annotations may be viewed by the remote expert in real time using whiteboarding. The remote expert likewise may make additional annotations to the snapshots using "whiteboarding" that can be viewed by the technician in real time. These annotations may then be stored by either the technician, remote expert, or both for future reference.

Computer 5000 can also be used to provide technical information to the technician or to exchange technical information between the technician and remote expert. This technical information includes, without limitation, blueprints, electrical schematic diagrams, fault logic diagrams, fault isolation processes, and troubleshooting routines. In addition, the technician could open a CAD application such as Autocad, available from Autodesk, Inc., 111 McInnis Parkway, San Raphael, Calif., and, if desired, select to share this application while using Netmeeting, causing the AutoCAD application to "pop-up" on the remote expert's conferencing window. The remote expert may then take control of the Autocad application that is being hosted on computer 5000 and exhibit the design plan views in a manner that will assist the technician and any other persons participating in the "Netmeeting." The Netmeeting application also permits instant text messaging, which would enable the technician to contact and collaborate with the remote expert online rather than using wireless audio communication. Netmeeting also permits files to be transferred between computer 5000 and the remote expert's computer. In addition to AutoCAD, any other suitable software package featuring "application sharing" may be used according to the present invention. One such software package is Visualizer, available from Parametrics Technology Corp., 128 Technology Drive, Waltham, Mass., 02453. The Virtual Bench software available from National Instruments can also be shared by the technician, remote expert, and others using Netmeeting or any other "application or desktop sharing" software package.

In addition to collaboration through "whiteboarding," the technician and remote expert may also collaborate using a more sophisticated version of "whiteboarding" known as "redlining." "Redlining" generally allows users to mark up vector based images (and certain bitmap formats such as CALS C4) using software applications such as Autodesk's Volo View, TMS View Director, available from TMSS Headquarters, 206 W. 6$^{th}$ Ave., Stillwater, Okla., 74074, Intergraph's ImageR, available from Integraph, Inc., 8252 Hwy. 20 West, Madison, Ala., and CPC View, available from Cartesian Products, Inc., 30 Wesley Street, Ste. 2, Newton, Mass. 02458. Product View, available from Parametric Technology Corp., may also be used for redlining applications or any other type of application sharing. "Redlining" is usually focused on the mark up of technical drawings because it can facilitate CAD and Computer Aided Engineering ("CAE") options such as layer assignment, revision history, dimensioning, and dynamic panning and zooming. Layers preferably can be designated so that another individual cannot override the changes made by the technician or remote expert. In addition to collaborating with the remote expert using the above applications, the technician preferably may likewise independently access these applications before collaborating with the remote expert.

In another embodiment of the present invention, software can be used to compress the real time video data in environments where the bandwidth available for data transmission is limited. This software can be used in conjunction with Netmeeting and other video conferencing software. In one embodiment of the present invention, the video compression software used is Wavelet 2000, available from Pegasus Imaging Corp., 4522 Spruce Street, Suite 200, Tampa, Fla., 33607. In addition, any other software application suitable for compressing real time video data can be used.

In another embodiment of the present invention, digital signature verification software, such as Sign-It for Microsoft Word and Adobe Acrobat 4.0, available from Communication Intelligence Corp., 275 Shoreline Drive, Suite 500, Redwood Shores, Calif., 94065-1413, may be used with the present invention.

In situations where wireless communication is unavailable or becomes temporarily disabled, the technician may collect data for later use, which is commonly referred to as "store and forward." When wireless communication becomes available, the technician preferably may retrieve the stored data and collaborate with the remote expert.

In addition to the above listed applications, computer 5000 may use any other software applications that facilitate collaboration between the technician and remote expert. Software applications that may be used with the present invention preferably include some or all of the following features: whiteboard, redlining, video and voice over internet protocol ("VoIP") technology, information sharing, and peer to peer file transfer. Software such as Microsoft Exchange may be used as the collaborative software according to the present invention. Computer 5000 may also be used to store voice and video data for future reference.

At locations where the use of a WLAN is not feasible or available, long range wireless LAN communication, as available from BreezeCom, 5858 Edison Place, Carlsbad, Calif., 92008, for example, may be used to establish wireless communication. If long range wireless LAN communication is not available, satellite based communication, as available from DirecPC, 11717 Exploration Lane, Germantown, Md., 20876, for example, may be used to establish wireless communication. In addition to these examples, any other type of wireless communication may be used with the present invention.

As shown in FIG. 2, battery 6000 supplies power to computer 5000 using power cable 6100. Battery 6000 is stored in battery housing 6200, which preferably supports battery 6000 from harness 8000. In a preferred embodiment of the present invention, battery 6000 is two Molicel ME202BB batteries, available from E-One Moli Energy Limited, North American Sales Office and Production Facility, Maple Ridge, BC, Canada, V2X 9E7. The Molicel MB202BB is preferred because of its high energy density characteristics and thermal resistance. The Molicel ME202BB is the battery that is shipped with the VIA IIB computer. The Energy Access SBS series smart battery charger that is also shipped with the ViA IIB computer is likewise preferred because it uses "smart charging technology" that allows the battery to be charged at various levels of discharge with diminished risk of developing battery "memory" or overcharging the battery. This battery supports Microsoft Windows Power Management, which will display the percentage of power remaining in the battery, can be set to send a warning message when the battery charge is reduced to a certain level, and allows the "hot-swapping" of batteries. In addition, this battery includes a touch sensitive film switch on the battery itself with a relative power indicator.

2. Probe

Referring to FIG. 1, probe 1000 is used to collect Property Data from an object of interest. Probe 1000 may be any device, including a data acquisition device ("DAD"), that is used to provide a physical connection between the data source point of the object of interest and computer 5000. Devices that may be used as probe 1000 include, without limitation, standard multi meter test leads, oscilloscope probes, frequency measurement probes, and scanner probes. Any probe 1000 that is used with the present invention preferably has been tested and/or approved as safe to use in testing and/or analysis applications. In a preferred embodiment of the present invention, the various devices that may be used as probe 1000 are the 5½ digit Digital Multi meter (p/n 777186-01) and P2 probe set (p/n 184698-01), available from National Instruments Corp., 11500 N. Mopac Expy., Austin, Tex., 78759-3504. In addition, any device suitable for use as probe 1000 may be used.

The Property Data collected from the object of interest using probe 1000 preferably is first transmitted through a fusable link adaptor ("FLA") 1500 before transmission to computer 5000. FLA 1500 preferably is used to isolate both the technician using the present invention and computer 5000 from any harmful or potentially dangerous voltages or other harmful and/or dangerous conditions that may be encountered while collecting data from the object of interest. In a preferred embodiment of the present invention, FLA 1500 is supplied by National Instruments Corp. However, any device suitable for isolating the technician and computer 5000 from harmful and/or dangerous voltages or other conditions may be used as FLA 1500.

Referring to FIG. 1, FLA 1500 preferably is secured to probe case 1200, and thus supported from harness 8000, using hook and piling fastener tape. Any other suitable fastening means including, without limitation, snaps, buttons, zippers, and clips may be used to secure FLA 1500 to probe case 1200. In addition, FLA may be positioned at any suitable location on harness 8000 or the body 10 of the technician.

Referring to FIG. 1, probe 1000 may comprise a positive lead 1010 and negative lead 1020. In this embodiment, positive lead 1010 preferably transmits Property Data via cable 1110 to FLA input 1510 and negative lead 1020 preferably transmits Property Data via cable 1120 to FLA input 1520. In another embodiment of the present invention, a single lead (not shown) may be used as probe 1500. Referring now to FIG. 2, the Property Data preferably is then transmitted from a FLA output 1530 to computer 5000, where the Property Data may be analyzed, stored, and/or transmitted.

Referring to FIGS. 1 and 2, probe 1000 preferably is stored in probe case 1200 when not in use. As discussed below, probe case 1200 preferably is supported from the body 10 of the technician using harness 8000. In addition, FLA 1500 preferably is secured to probe case 1200. However, probe 1000 and FLA 1500 may be supported from the body 10 of the technician at any suitable location.

In another embodiment of the present invention, computer 5000 will be capable of interacting with an object of interest using the RF spectrum and installed PCMCIA radio wireless LAN cards. In this embodiment, computer 5000 will be capable of interfacing with various Bluetooth and 802.11(x) sensors and devices. The primary purpose will be to extend the system's capability to extract data from the object of interest without direct physical connection. The data that may be collected using this embodiment includes, without limitation, parametric and other pertinent machinery performance information. This embodiment can further permit the technician and/or remote expert to respond to information received from anomalous indications.

3. Cameras

Referring to FIG. 1, general inspection camera 2000, detailed inspection camera 2500, and/or infrared camera 2900 can be used to collect video data that may be transmitted using wireless communication to the remote expert for use in collaborative data collection and/or problem resolution. The use of general inspection camera 2000, detailed inspection camera 2500 and infrared camera 2900 can enable the remote expert to provide "over the shoulder" advice to the technician while the technician gathers data. Unless specified otherwise herein, the term "video" includes, without limitation, NTSC, PAL, H.320, H.323, H.324, T.120, or composite or component video as required. General inspection camera 2000 preferably is used to provide real time video data to the remote expert to provide the remote expert with an overall idea of where the object of interest is located and where probe 1000 will be positioned upon the object of interest. Detailed inspection camera 2500 preferably is used to provide detailed images of the object of interest or other scenes when the resolution provided by general inspection camera 2000 is not adequate. Infrared camera 2900 can be used to collect infrared imagery of the object of interest. Infrared camera can be used to collect real time infrared video imagery and/or infrared "snapshots." For example, the technician may first use general inspection camera 2000 to show the remote expert the object of interest and then use detailed inspection camera 2500 to provide the remote expert with close up imagery of the object of interest to determine a suitable location to position probe 1000 when collecting data. The technician can also use infrared camera 2900 to collect real time video infrared imagery or infrared snapshots that may used for further analysis. As discussed above, the images taken with either general inspection camera 2000, detailed inspection camera 2500, and infrared camera 2900 may then be annotated in real time by either the technician or remote expert. The image and/or annotated image may then be stored by the technician and/or remote expert for later use.

As shown in FIG. 1, camera 2000 preferably is mounted upon a left shoulder strap 8300 of harness 8000. However, camera 2000 may likewise be mounted upon right shoulder strap 8400 or at any other location suitable for collecting video data. Camera 2000 preferably is secured to a camera mounting pad 2200 using elastic straps (not shown), but may also be secured to camera mounting pad 2200 using any other suitable fastening means including hook and piling fastener tape, snaps, buttons, zippers, and clips. Camera mounting pad 2200 preferably is secured to shoulder strap 8300 using hook and pile fastener tape that is secured to the lower surface of camera mounting pad 2200 and the outer surface of shoulder strap 8300. However, any suitable fastening means may be used to secure camera mounting pad 2200 to shoulder strap 8300 including, without limitation, zippers, buttons, snaps, and clips.

Referring to FIG. 2, camera 2000 transmits video data to computer 5000 using video cable 2100. In one embodiment of the present invention, video cable 2100 is a USB cable. However, video cable 2100 may be any means suitable for transmitting video data including, without limitation, a USB v. 2.0 or "firewire" interface. In a preferred embodiment of the present invention, camera 2000 is a 3Com Home Connect web camera, available from 3Com, Inc., 5400 Bayfront Plaza, Santa Clara, Calif., 95052-8145. The software drivers of this camera fully support Microsoft Windows "plug and play," which permits the "hot swapping" of USB devices. In addition to the 3Com Home Connect web camera, any camera suitable for collecting and transmitting real time video data may be used as general inspection camera 2000. Preferably, camera 2000 is characterized by features including low bandwidth, low light sensitivity, rugged construction, compatibility with existing interface ports, water resistance, thermal resistance to both high and low temperatures, shock resistance, and a low profile.

In another embodiment of the present invention, detailed inspection camera 2500 preferably is used to collect detailed "snapshots." Detailed inspection camera 2500 preferably is stored in camera storage case 2700 when not in use. Camera storage case 2700 preferably is secured to harness 8000, as will be discussed further below.

When detailed imagery snapshots are desired, the technician preferably removes detailed inspection camera 2500 from camera storage case 2700, powers up camera 2500 if the power is not already turned on, and takes the desired snapshots. After the desired snapshots are taken, the snapshots are downloaded to computer 5000 using video cable 2510. Camera 2500 can have its own power source, or it can be powered by battery 6000. If camera 2500 uses its own power source, video cable 2510 does not need to be connected to camera 2500 while the snapshots are taken. In this embodiment, the snapshots may be reviewed by the technician before they are downloaded to computer 5000 and then transmitted using wireless communication. This embodiment preferably is used to ensure that confidential or otherwise restricted access information is not accidentally downloaded or transmitted. If camera 2500 receives its power from battery 6000, such power can be provided via video cable 2510 connecting camera 2500 to computer 5000, which in turn is connected to battery 6000 via cable 6100. In this embodiment, camera 2500 is connected to computer 5000 while the snapshots are taken.

Once the desired snapshots are taken, the snapshots can be downloaded to computer 5000. Once the snapshots are downloaded to computer 5000, the technician may view the snapshots on display unit 4000. The technician can then annotate the snapshots using a touch screen display unit 4000. For example, the snapshots taken with the detailed inspection camera 2500 can be annotated using the Netmeeting software application, available from Microsoft, Inc., One Microsoft Way, Redmond, Wash., 98052-6399. Netmeeting is preferred because of its "whiteboarding" feature, which permits individuals using the Netmeeting software to bring up a bitmap image, e.g., the snapshot taken by the detailed inspection camera 2500, and share the ability to mark-up and annotate the image. In the present invention, the use of this "whiteboarding" feature permits live collaboration and allows the technician and remote expert to mark-up and annotate the snapshot in real time, thus allowing both the technician and remote expert to view the annotations as they are made. For example, the remote expert could highlight areas of concern or point out a desired location to position probe 1000 on the snapshot while the snapshot is being viewed by the technician. The annotations made to the snapshots may then be stored for future reference.

In addition to Netmeeting, any other software application that allows the annotation of images in real time including, without limitation, PlaceWare, available from PlaceWare, Inc., 295 N. Bernardo Ave., Mountain View, Calif., and Microsoft Exchange, may be used in the present invention. Another software application that may be used for live collaboration is Infoworkspace, available from General Dynamics Electronic Systems, 100 Ferguson Drive, P.O. Box 7188, Mountain View, Calif., 94039-7188, which is a java-based software application that allows the use of a "thin-client" so that specialized collaboration software does not have to reside on computer 5000 and can be installed as needed.

In another embodiment of the present invention, the technician may use infrared camera 2900 to collect real time infrared video imagery and infrared images. These images may be downloaded and annotated in the same manner described above for the images taken with detailed inspection camera 2500. When infrared camera 2900 is used in lieu of detailed image camera 2500, infrared camera can be stored in case 2700. When infrared camera 2900 is used in conjunction with detailed inspection camera 2700, both cameras 2700 and 2900 may be stored in a single large case (not shown) supported from harness 8000 or infrared camera 2900 may be stored in a separate case 2200 that can be supported from harness 8000. Infrared camera 2900 used in this embodiment may be either Heat Find or Video Therm series cameras available from Monroe Infrared Technologies, 62 Portland Road, Suite 6, P.O. Box 1058, Kennebunk, Me. 04043. Other suitable infrared cameras also may be used.

In a preferred embodiment of the present invention, the remote expert may use a touch sensitive smart board (not shown) available from SMART Technologies, Inc., Suite 600, 1177-11th Ave. S.W., Calgary, Alberta, Canada (or a similar device), to annotate images.

In a preferred embodiment of the present invention, the detailed inspection camera 2500 is a 990 Nikon Cool Pix, available from Nikon, Inc., 1300 Walt Whitman Road, Melville, N.Y., 11747-3064. The 990 Nikon Cool Pix preferably is used as detailed inspection camera 2500 because of its sophisticated auto-flash capability, battery life, 3.3 Megapixel resolution, and USB output. However, any digital camera that is capable of taking high resolution still and video imagery, has low light sensitivity, has a long battery life, is rugged and water resistant, and preferably capable of sharing the power source of computer 5000 may be used as detailed inspection camera 2500.

In another embodiment of the present invention (not illustrated), a single camera used in place of camera 2000 and/or camera 2500 can be integrated into display unit 4000.

4. Display

Figure 3:
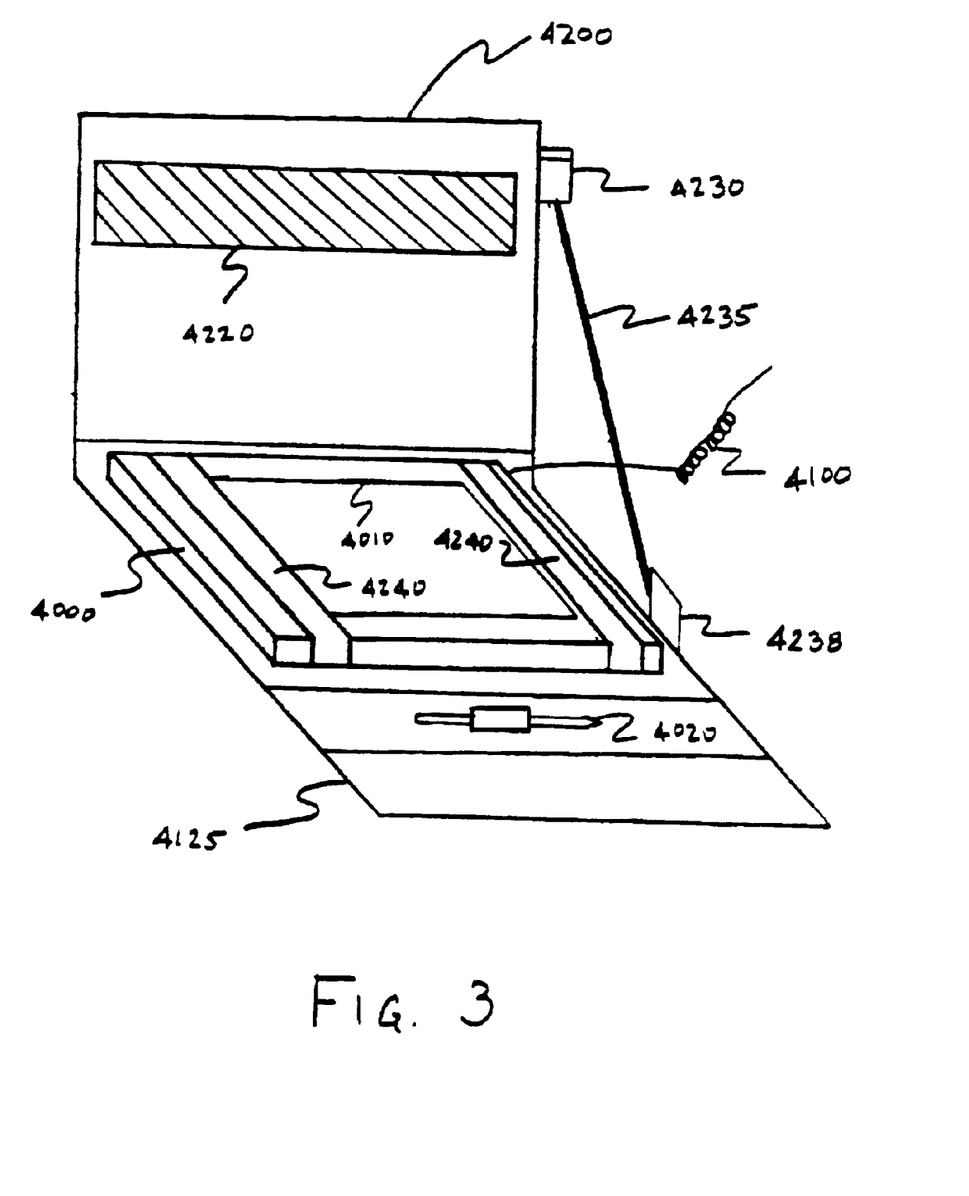
FIG. 3 is a schematic diagram of a display unit stored in a housing.

As shown in FIGS. 1 and 3, display unit 4000 is used to provide data to the technician wearing the present invention and to exchange data between the technician and remote expert. Referring to FIG. 3, display screen 4010 of display unit 4000 preferably utilizes a thin film transistor ("TFT") touch sensitive display surface, thus combining both video and "mouse" functions into display unit 4000. The technician using the present invention preferably interfaces with display unit 4000 using a pen stylus 4020 on display screen 4010. Display unit 4000 preferably is stored in display housing 4200. Display unit 4000 is connected to computer 5000 using display cable 4100.

Display unit 4000 is used to provide data to the technician and to exchange data between the technician and the remote expert. For example, after the technician has frozen images taken with camera 2000 or taken snapshots of the object of interest using detailed inspection camera 2500 and downloaded the images to computer 5000, display unit 4000 may be used to view the images. When display screen 4010 uses a TFT touch sensitive display surface, the technician may use the "whiteboarding" feature of Microsoft Netmeeting to make annotations using pen stylus 4020 on the image that can be viewed by the remote expert in real time. The data from the real time collaboration also may be stored for future reference.

Display unit 4000 may also be used by the technician to view technical manuals or other information regarding the object of interest. This technical information can include, without limitation, blueprints, interactive troubleshooting and maintenance procedures, electrical schematic diagrams, fault logic diagrams, fault isolation processes, and troubleshooting routines. Display unit 4000 may also be used by the technician to view the Property Data collected from the object of interest.

In a preferred embodiment of the present invention, display unit 4000 is a ViA II PC Pen Tablet with an Indoor Readable display, available from ViA, Inc., 12550 West Frontage Road, Ste. 201, Burnsville, Minn. 55337. The Indoor Readable display is preferred because of its backlight feature. A Sunlight Readable display, also available from ViA, Inc., may be used as display 4000 in situations where the present invention is being used outdoors where sunlight may interfere with the ability of the technician to view display screen 4010. In another embodiment of the present invention, a transflective screen, available from ViA, Inc., or a Hewlett Packard No Power display, available from Hewlett Packard, 3000 Hanover Street, Palo Alto, Calif. 94304-1185, may be used as display unit 4000.

As shown in FIGS. 1 and 3, display unit 4000 preferably is stored in display housing 4200 to support display unit 4000 from harness 8000. As shown in FIG. 1, display housing 4200 preferably is configured to permit display unit 4000 to be extended from the body 10 of the technician when in use for hands-free operation and to permit display unit 4000 to be stored in a position flat against the body 10 of the technician when not in use (not shown). In a preferred embodiment of the present invention as shown in FIG. 3, the angle at which display unit 4000 extends from the body 10 of the technician, and the angle at which display unit 4000 may be viewed when in use, may be adjusted through the use of a support cord 4235 and barrel stops 4230 and 4238. Using barrel stops 4320 and 4238, the length of support cord 4235 may be adjusted, thereby controlling the angle at which display unit 4000 extends from the body of the technician.

Also as shown in FIG. 3, display 4000 preferably is fastened to display housing 4200 using fastening straps 4240. Fastening straps 4240 preferably are permanently secured to display housing 4200 at one end and removably fastened to display housing 4200 at the other end using hook and pile fastener tape or any other suitable fastening means including, without limitation, snaps, buttons, and clips. In this embodiment of the present invention, display 4000 may be removed from display housing 4200 for use in displaying information to others by either unfastening fastening straps 4240 or sliding the display in a lateral direction when fastening straps 4240 are loosened.

Although not shown in FIGS. 1 or 3, when display unit 4000 is not in use, display unit may be stored in a flat position against the body 10 of the technician by folding a storage flap 4125 inwards towards the body 10 of the technician. A mounting strip preferably made of hook and pile fastener tape preferably is mounted upon the outer surface of a storage flap 4125 and mounting strip 4220. In addition to hook and piling fastener tape, any suitable fastening means may be used to secure storage flap 4125 to mounting strip 4220 including, without limitation, zippers, buttons, and snaps.

In another preferred embodiment of the present invention, a head mounted display 3300 may be used in lieu of or in conjunction with display 4000. As shown in FIG. 1, head mounted display 3300 may be mounted on an arm 3310 extending from headset 3000. In addition, head mounted display 3300 may be incorporated into a pair of safety glasses. The use of head mounted display 3300 would enable the technician to use "augmented reality" software applications. In a preferred embodiment of the present invention, a Liteye 300, available from Liteye Microdisplay Systems, LLC, 12415 Dumont Way, Unit #103, Littleton, Colo. 80125, may be used as head mounted display 3300. In another embodiment, a display available from Microvision, Inc., 19910 North Creek Parkway, Bothell, Wash., 98011, may be used as head mounted display 3300. When the Microvision head mounted display or any other head mounted display that employs retinal scan display technology is used, the data collected from the object of interest can be "superimposed" over the object of interest as the data is collected, enabling the technician to view data as it is collected without having to look away from the object of interest. In yet another embodiment of the present invention, head mounted display 3300 can be a modified Sony PLM-S700 PC Glasstron. Head mounted display 3300 used according to the present invention may use technology including, but not limited to, curvilinear prism technology, liquid crystal display technology, or retinal scan display technology.

The present invention likewise may incorporate a wrist mounted keyboard (not shown), a wrist mounted finger mouse (not shown), or any other ergonomically adapted keyboard or mouse (not shown).

5. Headset

Referring to FIG. 1, headset 3000 preferably is used to facilitate audio communication between the technician and remote expert. Headset 3000 preferably comprises a speaker 3010 and microphone 3020. Audio data preferably is transmitted from headset 3000 to computer 5000 using audio cable 3100. As discussed above, headset 3000 can further comprise a head mounted display.

In a preferred embodiment, headset 3000 is an ANC100, available from Andrea Electronics Corp., 45 Melville Park Road, Melville, N.Y., 11747. In one embodiment, an analog audio cable (not shown) is used to connect headset 3000 to computer 5000. In another embodiment, a USB adaptor, preferably a C1-10166004, available from Andrea Electronics Corp., is used to permit headset 3000 to interface with computer 5000 using a USB interface. This embodiment uses digital audio, which can improve audio quality. In addition, any headset suitable for exchanging audio communication may be used as headset 3000.

6. Harness

As shown in FIGS. 1, 2, and 4, harness 8000 preferably is used to support probe 1000, general inspection camera 2000, detailed inspection camera 2500, infrared camera 2900, display unit 4000, computer 5000, battery 6000, and accessory pouch 7200 from the body 10 of the technician wearing the present invention. Referring to FIG. 4, a preferred embodiment of harness 8000 is a modified "back support belt" commonly worn by warehouse workers to ease the strain of lifting and long hours standing on concrete floors. An inner belt 8100 is a typical adjustable back support belt preferably with an outer hook and pile fastener tape surface. In addition to hook and piling fastener tape, any other method of fastening may be used such as buttons, snaps, and zippers. Inner belt 8100 preferably is adjustable to many body types because it is fastened using a hook and piling fastener tape patch (not shown) located on the inside surface of an outer flap 8110. An adjustable outer belt 8200 preferably constructed from nylon is positioned over inner back support belt 8100 and is held in place using support loops 8210 that are secured to the outer surface of inner belt 8200. Outer belt 8200 preferably is adjustable and may have its ends fastened to one another using clasp 8230 as shown in FIG. 4. The ends of belt 8200 may also be secured to one another using any other suitable fastening means including, without limitation, buckles, snaps, button, hook and pile fastener tape, and clips. Harness 8000 as shown has the added benefit of providing additional lumbar support to the technician wearing the present invention. Harness 8000 can be supplied by Red Raven, 372 Boothbay Road, Edgecomb, Me. 04556.

Accessory pouch 7200 preferably is an "accordion" pouch with two pockets and a hook and pile fastener tape flap. In addition to hook and pile fastener tape, any suitable fastening means including, without limitation, buttons, snaps, hooks, and clips may be used to close accessory pouch 7200.

Probe 1000, cameras 2000, 2500, and 2900, display unit 4000, computer 5000, battery 6000, and accessory pouch 7000 may be supported from outer belt 8200 by running outer belt 8100 through support loops (not shown) located on the inside surfaces of probe case 1200, camera cases 2200 and 2700, display housing 4200, computer housing 5200, battery housing 6200, and accessory pouch 7200. In a preferred embodiment of the present invention, hook and pile fastener tape patches sewn onto the support loops located on the inside surfaces of probe case 1200, camera cases 2200 and 2700, display housing 4200, computer housing 5200, battery housing 6200, and accessory pouch 7200 prevent the various components from sliding about inner belt 8200 because the hook and pile fastener tape patches on the support loops adhere to the outer hook and pile fastener tape surface of inner back support belt 8100. This preferred embodiment has the added benefit of allowing other components such as additional storage pockets to easily be supported from outer belt 8200. In addition, this embodiment allows for the reconfiguration, addition, or deletion of various components depending upon the technician's needs. In addition to this preferred embodiment, any fastening means including snaps, buttons, zippers and clips may be used to support the components from harness 8000.

As shown in FIG. 4, harness 8000 also comprises adjustable shoulder straps 8300 and 8400 that provide additional support for the technician wearing the present invention. Shoulder straps 8300 and 8400 preferably are adjusted so that inner back support belt 8100 is properly positioned on the technician.

As shown in FIG. 4, cable conduits 8610 and 8630 preferably are incorporated into harness 8000 to prevent the cables used in the present invention from causing inconvenience or snagging. As shown in FIG. 4, cable conduit 8630 preferably runs along the upper edge of inner belt 8100 and cable conduit 8610 runs along the outside of shoulder strap 8300 and 8400. In addition to this embodiment, cable conduits may be positioned at any other suitable location in harness 8000.

Cable conduits 8610, 8620, and 8630 preferably are constructed from two-sided hook and pile fastening tape. One edge of the tape is secured to harness 8000 using stitching or any other suitable fastening means including, without limitation, snaps, buttons, zippers, or clips. The other edge of the tape preferably remains free. The cable to be passed through the conduit preferably is rolled into the tape, enclosing the cable in the conduit. An advantage of using the hook and piling fastening tape in this embodiment is the ability to create an aperture at any point along the conduit to permit the cable to exit the conduit. Corresponding apertures may be made at other location throughout the cable conduits to permit the cables to be appropriately positioned.

In addition to the above example, any other suitable material may be used to construct cable conduits 8610, 8620, and 8630, and cable conduit may be positioned at any appropriate location on harness 8000.

Harness 8000 as shown in FIG. 1, FIG. 2 and FIG. 4 is a preferred embodiment of the present invention. However, there are numerous other means that may be used to support probe 1000, cameras 2000, 2500, and 2900, display unit 4000, computer 5000, battery 6000, and accessory pouch 7000 from the body of the technician. For example, a harness could be used that incorporates pockets to hold the various components. In addition, a harness could be used that has probe case 1200, camera cases 2200 and 2700, display housing 4200, computer housing 5200, battery housing 6200, and accessory pouch 7200 fastened to the outside surface of the harness at suitable locations on the body 10 of the technician wearing the harness as shown in FIGS. 1 and 2.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A system including a wearable apparatus for on-site testing and diagnostic analysis of a device, the system comprising:
   a computer for storing and processing data;
   a data acquisition device adapted to communicate with the computer, wherein said data acquisition device is connected to the device to collect Property Data and to provide the collected Property Data to the computer for onsite testing and diagnostic analysis of the device;
   a first camera, in communication with the computer, for collecting image data of the device and providing the image data to the computer;
   a display, in communication with the computer, for displaying visual data from the computer;
   a microphone, in communication with the computer, for providing first audio data to the computer;
   a speaker, in communication with the computer, for providing second audio data from the computer to a user of the wearable apparatus;
   a power source, in communication with the wearable apparatus, for providing a source of power to the wearable apparatus; and
   a harness, adapted to support at least the computer, the harness being adapted to be worn on a body of the user as a part of the wearable apparatus;
   wherein the computer is adapted to provide testing and diagnostic capability to the user based on the collected Property Data.

2. The system of claim 1, further comprising:
   a remote expert location, in wireless communication with the computer, enabling real-time collaboration between the user of the wearable apparatus and a remote expert who can advise the user regarding the on-site testing or diagnostic analysis of the device.

3. The system of claim 1, further comprising:
   a remote expert location, in wireless communication with the computer, enabling real-time collaboration between the user of the wearable apparatus and a remote expert who can advise the user regarding the on-site testing or diagnostic analysis of the device;

wherein the system is enabled for an exchange of real time streaming video, allowing the remote expert to advise the user while the user is at a location of the device.

4. The system of claim 1, further comprising:

a remote expert location, in wireless communication with the computer, enabling real-time collaboration between the user of the wearable apparatus and a remote expert who can advise the user regarding the on-site testing or diagnostic analysis of the device;

wherein the system is enabled for annotation of images by the remote expert or user, thereby facilitating the on-site testing or diagnostic analysis of the device.

5. The system of claim 1, wherein the computer is adapted to run software enabling the computer to emulate at least one of a digital multi-meter, oscilloscope, signal analyzer, waveform generator, function generator, counter, timer logic analyzer, waveform editor, device calibrator and data logger.

6. The system of claim 1, wherein the data acquisition device includes an electrical probe connected to at least one FLA.

7. The system of claim 6, wherein the electrical probe includes positive and negative test leads.

8. The system of claim 1, wherein the data acquisition device includes a data collection unit, in wireless communication with the data acquisition device for receiving the Property Data of the device from the data acquisition device and transmitting other data to the data acquisition device.

9. The system of claim 1, wherein the image data includes one of real time video and a detailed snapshot.

10. The system of claim 1, further comprising:

a second camera, in communication with the computer, for collecting image data of the device and providing the image data to the computer;

wherein the first camera is an inspection camera and the second camera is an infrared camera.

11. The system of claim 1, wherein the computer includes a graphical user interface for use by the user.

12. The system of claim 1, wherein the computer is enabled for a whiteboarding feature.

13. The system of claim 1, wherein the display includes a thin film transistor touch sensitive display surface.

14. The system of claim 1, wherein the testing and diagnostic capability provided to the user is further based on information from a remote expert.

15. An apparatus for use by a technician to facilitate at least one of testing and diagnosing the condition of a device, comprising:

a computer adapted to store and to process data and adapted to be worn on a user's body;

a data acquisition device in communication with the computer, wherein the data acquisition device connects to the device to collect Property Data describing at least one property of the device for testing and diagnosing the condition of the device;

a first camera in communication with the computer and adapted to obtain first imagery relevant to the device;

a second camera in communication with the computer and adapted to obtain second imagery relevant to the device;

a microphone in communication with the computer;

a speaker in communication with the computer;

a display unit in communication with the computer; and a battery adapted to provide power to at least one of the display unit and the computer.

* * * * *